3,250,725
METHOD FOR PRODUCING BORO-SILICA GELS
Victor C. Vescovi, Boron, Calif.
(418 West, Avenue J–10, Lancaster, Calif.)
No Drawing. Filed July 11, 1961, Ser. No. 123,131
8 Claims. (Cl. 252—317)

This invention relates to a method for producing boro-silica gels and products produced thereby. More particularly, this invention relates to a method for producing boro-silica gels from clays by treating said clays with borate solutions thereby effecting simultaneous purification of boron compounds and extraction of valuable constituents from clay such as iron hydroxide, alumina and magnesia. There are a number of methods for producing boro-silica gels from clay. For instance, such specific gels have been used as catalysts in the cracking of petroleum and other hydrocarbons. The boro-silica gel prepared from clay in accordance with prior methods is only produced in a clay supported form which, for the particular use as a purifying adsorbent, would not be as effective as one produced in an unsupported form. It is known that substantial amounts of undesirable impurities, such as iron, aluminum and magnesium still remain in the clay after acid activation. It will be appreciated that such impurities are extremely high in a clay supported gel as such a clay has adsorbed therein further undesirable impurities from the boron solution employed in the digestion step.

Accordingly, it is a primary object of the present invention to disclose a method for producing a boro-silica gel from clay wherein the yield of the boro-silica gel has a high degree of purity and is in an unsupported form.

It is another object of the present invention to disclose a method for producing a boro-silica gel from activated clays by means of a boron compound.

It is another object of the present invention to disclose a unique boro-silica gel produced by the method of the present invention.

It is still another object of the present invention to disclose a method for purifying boron compounds.

It is yet another object of the present invention to disclose a method for extracting valuable constituents from clay such as iron hydroxide, alumina and magnesia.

These, together with other objects and advantages which will become subsequently apparent, reside in the details of the method and product as more fully hereinafter described and claimed.

In carrying out the method of the present invention, any natural clay, mud from boron ore dissolvers and thickeners, borax operation "tailings," fuller's earth, kieselguhr and diatomaceous earth can be used in the present invention. The clay, in a finely divided condition is treated with a hot diluted hydrochloric acid or sulfuric acid until the isoelectric point is reached. Next the clay is repeatedly washed with dilute acid. Thereafter, washing with water produces the necessary activated clay. An amount of activated clay not higher than 10% by weight relative to the boron compound solution, i.e. activated clay 10 parts boron compound solution 90 parts, may be digested and stirred with a hot boron compound solution which may be a borax liquor having a sp. gravity of 1.220. By this treatment the boron compound undergoes a double simultaneous purifying action due to adsorptive properties of both the activated clay and the gel formed. The suspension is filtered and soon after removal of the residue, i.e. the clay supported gel, a copious unsupported gel as boro-silica forms in the filtrate as the valuable product. The suspension may then be stirred or centrifuged. Additionally, an acid may be added to hasten gel precipitation. The gel is allowed to settle and the clear liquor is separated by subsequent decantation. The clear decantate is filtered or centrifuged. The borate is recrystallized into the purified final product.

The novel superior adsorbent and catalyst of the present invention can be generally defined as a synthetic boro-silica gel. However, it need not be a pure chemical compound, but can be any material of the general composition of $B_2O_3 \cdot SiO_2 \cdot H_2O$ or $B_2O_3 \cdot SiO_2$. The oxides of boron and silicon can be combined in any desired proportions to form solid solutions or loose chemical associations which are not bound by the rigid laws of stoichiometry. However, it is important that the boron oxide and silicon dioxide be intimately associated with each other and not merely mechanically admixed. Minor proportions of other metallic oxides can also be present along with the boron oxide.

While it has been noted that in carrying out the present invention, an acid treated clay is employed, the boro-silica gel can also be prepared with a clay which has not been acid treated or has been extruded, or has undergone an additional thermal activation before or after acid treatment. The method of the present invention is extremely economical in that the yield of the unsupported gel is considerably higher than that adsorbed on the clay, as this is proved by the loss in weight of a clay supported gel as compared with that of the activated clay used for its preparation. Additionally, the unsupported gel's yield would be entirely lost utilizing a clay supported gel method. Furthermore, it will be noted that due to better utilization of the silica within the clay, the method for preparing the boro-silica gel of the present invention utilizes the clay as a source of silica and it is not necessary, therefore, as may be found in the prior art methods, that additional silicates must be added.

The boro-silica gel, prepared according to the present invention, can be used as such or finds other useful applications as one of the starting material for the preparation of other activated gels such as boro-silica alumina gels and boro-silica magnesia gels. The former is prepared by stirring a boro-silica gel water suspension with aluminum chloride and alkalizing the solution with ammonia. The latter is prepared by treating a boro-silica gel suspension with magnesium chloride.

In order to provide further elucidation of the method of the present invention, the following examples are set forth. It will be noted that these examples vary as to the applicable method of the present invention; however, the examples are not deemed to limit the invention.

Example I

| | Parts |
|---|---|
| Activated clay | 10 |
| Borax solution (sp. gravity 1.240) | 90 |

The powdered activated clay is suspended in the borax solution while in a heated condition in order to digest the clay. The suspension is then filtered and the residue discarded. Copious boro-silica gel forms in the filtrate. In order to enhance the formation of the gel, the suspension may be acidified to a pH of 7. The boro-silica gel formed is then filtered and washed with several increments of water.

Example II

| | Parts |
|---|---|
| Activated clay | 2 |
| Borax solution (sp. gravity 1.240) | 98 |

The boro-silica gel is prepared in the same manner as in connection with Example I.

It is possible to employ the boro-silica gel of the present invention in order to prepare a boro-silica alumina magnesia gel. This is accomplished by employing either hydrochloric or sulfuric acid washings obtained as by-products from leaching of clays. For instance 100 cc.

of washings obtained by leaching 1 part clay by weight to 6 parts of 20% sulfuric acid, having approximately a specific gravity of 1.120 at 98° C. are added to 100 cc. of water. A sufficient amount of an ammonium salt is added. The function of the ammonium salt is to prevent the co-precipitation of magnesium hydroxide when iron hydroxide is separated in a later step. A borate solution, for instance borax in a quantity of 115 cc. and having a specific gravity of 1.110 at 80° C. is added. This results in the precipitation of iron hydroxide which is filtered out. The filtrate is allowed to settle and is refiltered. The resulting filtrate is then added to a water suspension of a hydrated boro-silica gel produced in accordance with the present invention until slightly alkaline. The mixture is then stirred for a period of approximately one-half hour. The thereby produced boro-silica alumina magnesia gel is filtered out and washed several times with water.

In order to prepare a boro-silica magnesia gel, the same steps are employed as discussed in the previous paragraph except that the aluminum hydroxide is permitted to precipitate out. In other words, the filtrate from the separation of the iron hydroxide is diluted with water, boiled and allowed to settle, and is again filtered. The filtrate is then made up to 750 cc. with water and a boron compound solution such as borax is added until the solution is slightly alkaline. The solution is then brought up to a refluxing condition in order to precipitate aluminum hydroxide which is then filtered out. A water suspension of boro-silica gel is added to the filtrate and the thus formed boro-silica magnesia gel is filtered out and washed.

In order to illustrate the recovery of alumina and magnesia from said washings of crude clay, the powdered clay is leached, in hot condition, with either hydrochloric or sulfuric acid. As an example, one part clay by weight to six parts of 20% sulfuric acid is employed. The mixture is filtered and the residue is repeatedly treated with weaker acid solutions and finally washed free of acid. 100 cc. of hot filtered acid washings having an approximate specific gravity of 1.120 are diluted with 100 cc. of water. A sufficient amount of an ammoniacal salt and a boron compound, for instance, 115 cc. of a borax solution having approximately a specific gravity of 1.110 is added until the resultant is slightly acid or neutral. The iron hydroxide precipitate is removed by filtration as a by-product. The filtrate is further diluted with water, boiled, allowed to settle and again filtered. It is then made up to 750 cc. with water, an additional amount of borate solution is applied until slightly alkaline and the solution boiled to precipitate aluminum hydroxide which is filtered out. Magnesium hydroxide is recoverable from the filtrate by addition of an alkali. When clay is leached with hydrochloric acid, the magnesium is present in the last filtrate as a chloride. It can be recovered by conventional electrolysis procedure.

The following describes the recovery of alumina still present in a clay after acid leaching. The acid leached clay is digested, in hot condition, with a strong alkaline borate solution, for instance, with a borax solution of specific gravity of 1.200. By means of this treatment, a considerable amount of silica dissolves and is removed from clay, thereby substantially increasing its alumina content. The resulting spent clay is separated by filtration and washed for further processing. The dissolved silica may be recovered as a valuable by-product as boro-silica gel and the filtrate may be recycled. The spent clay is now treated again with a fresh borate solution and, this time, instead of silica, a substantial amount of alumina, free, or relatively free of silica is dissolved. Prior to the second treatment with the fresh borate solution, the spent clay can also be leached with an alkali solution if desired. In both cases the resulting clay is treated with fresh borate solution for several consecutive times until all the alumina has been separated from the clay. The alumina having been separated from clay which is free of silica according to this method, aluminum may be extracted by employing conventional methods.

It will be further seen that by carrying out the present invention on clays, it is possible to recover substantially all the clay constituents such as silica, iron, alumina and magnesia. This is accomplished by treating the clay with a succession of steps including a hot borate solution.

The foregoing is considered as illustrative only of the principles of the invention. Further, since numerous modifications and changes will readily occur to those skilled in the art, it is not desired to limit the invention to the exact method and product shown and described, and accordingly all suitable modifications and equivalents may be resorted to, falling with the scope of the invention as claimed.

What is claimed as new is as follows:

1. The method for producing a boro-silica gel comprising reacting 2–10 parts by weight of a clay with 98–90 parts by weight of a borax solution, separating the clay from the solution, and collecting from the remaining solution the flocculent boro-silica gel precipitate thereby produced.

2. The method for producing a boro-silica gel comprising treating 2–10 parts by weight of an activated clay with 98–90 parts by weight of a borax solution, filtering the remaining spent clay from the liquid, and collecting from the remaining solution the flocculent boro-silica gel precipitate thereby produced.

3. The method for producing a boro-silica-magnesia gel comprising leaching about one part by weight of a clay with about 6 parts by weight of a dilute acid selected from the group consisting of hydrochloric acid and sulfuric acid solutions, adding a borax solution to the leach material until said leach material becomes alkaline, separating the aluminum hydroxide and iron hydroxide precipitates from the leach material, adding the remaining leach material to a boro-silica gel suspension, and collecting the flocculent boro-silica-magnesia gel precipitate thereby produced.

4. The method of claim 3 wherein the clay is an activated clay.

5. The method for producing a boro-silica-magnesia gel comprising leaching about one part by weight of a clay with about 6 parts by weight of a dilute acid selected from the group consisting of hydrochloric acid and sulfuric acid solutions, adding a borax solution to the leach material until said leach material becomes alkaline, separating the aluminum hydroxide and iron hydroxide precipitates from the leach material, and adding the remaining leach material to a boro-silica gel produced by treating a clay with a borax solution and separating the clay from the thereby formed boro-silica gel.

6. The method of claim 5 wherein the clay is an activated clay.

7. The method for producing a boro-silica-alumina gel comprising reacting about 2–10 parts by weight of a clay with about 98–90 parts by weight of a borax solution, separating the clay from the remaining solution, collecting from the remaining solution the flocculent boro-silica gel precipitate thereby produced, treating the boro-silica gel with aluminum chloride and thereafter alkalizing with ammonia.

8. The method for producing a boro-silica-magnesia gel comprising reacting about 2–10 parts by weight of a clay with about 98–90 parts by weight of a borax solution, separating the clay from the remaining solution, collecting from the remaining solution the flocculent boro-silica gel precipitate thereby produced, treating the boro-silica gel with magnesium chloride and thereafter alkalizing with ammonia.

(References on following page)

References Cited by the Examiner

UNITED STATES PATENTS

| | | | |
|---|---|---|---|
| 2,206,021 | 7/1940 | Blunck | 252—432 XR |
| 2,230,464 | 2/1941 | Marschner | 252—432 XR |
| 2,522,605 | 9/1950 | Cundiff | 23—143 |
| 2,584,405 | 2/1952 | West | 252—432 |
| 2,645,616 | 7/1953 | Govett et al. | 252—317 |
| 2,947,604 | 8/1960 | Laist | 23—143 |
| 2,966,466 | 12/1960 | Schwartz | 252—317 |

JULIUS GREENWALD, *Primary Examiner.*

MAURICE A. BRINDISI, *Examiner.*